Patented Nov. 14, 1944

2,362,635

UNITED STATES PATENT OFFICE 2,362,635

EMULSION PAINT AND METHOD OF PRODUCING THE SAME

Leslie James Howlett, Lindfield, New South Wales, Australia

No Drawing. Application July 15, 1940, Serial No. 345,600½. In Australia August 24, 1939

2 Claims. (Cl. 106—266)

This invention relates to a new and improved method of and means for emulsifying oil, wax, grease and the like, and it has more particular reference to the emulsifying of animal, mineral, vegetable and synthetic oils, bitumen, tar and other similar or allied substances in a simple and economical manner. The invention also has reference to the application of the method of and means for emulsifying to the manufacture of paints, oil varnishes, oil lacquers, enamels and other pigments, so that considerable economies may be effected in such manufactures.

Broadly my invention consists of the addition of magnesium carbonate and water to the oil or the like, or alternatively, the addition of magnesium carbonate and oil to a water base and the thorough mixture of such ingredients to effect an emulsification.

The magnesium carbonate referred to throughout this specification and in the appended claims is not only that which is known pharmacopeially as magnesii carbonis levis, but also a mineral substance in its natural state known as magnesium carbonate.

The gallons referred to throughout are Imperial gallons, as distinguished from U. S. gallons.

According to one exemplary embodiment of my invention, it is applied to the manufacture of paint, as for example a paint of which the primary ingredients according to present methods are zinc oxide or white lead and linseed oil. In such a paint manufactured according to my invention, the proportions of the essential ingredients would be as follows:

Zinc oxide (or white lead) __hundredweight__ 1
Linseed oil _____gallons__ 6½
Magnesium carbonate _____pound__ 1
Water _____gallons__ 3½

The zinc oxide is thoroughly mixed with the oil, and a mixture of the magnesium carbonate and the water is prepared. The two mixtures are then thoroughly mixed together, until the paint is found to be completely emulsified. The application of the invention to the manufacture of paint does not preclude the addition of other ingredients commonly used in paint manufacture, such as titanium oxide, and suitable dryers, which may be added to the mixture in the usual manner. Paint manufactured in this manner utilises 3½ gallons of water in place of the like amount of linseed oil which would be used in present processes of manufacture, and so it will be seen that, since magnesium carbonate is an inexpensive additional constituent, a considerable saving in the cost of manufacture is effected by the application of my invention. Magnesium carbonate is a very mild alkali, and being used in small proportions has no deleterious effect upon the paint. It is found, indeed, that paint manufactured according to this embodiment of my invention is highly weather-resistant, and retains its fine finish for a considerable time.

The invention may, however, be applied to prepared paint and in this case 2 ounces of magnesium carbonate may be mixed with two pints of water and the mixture thus made may be added to and thoroughly mixed with 1 gallon of prepared paint. The added water according to this mixture equals 25% of the liquid measurement of the paint and paint so prepared will retain its gloss; the quantity of water used may, however, be increased up to 50% but at that point the paint will give a flat finish. A matt finish, however, may be obtained by mixing zinc oxide or lead oxide with sufficient oil to make a heavy body paint and adding thereto a quantity of turpentine equal to the quantity of oil and after thoroughly mixing these ingredients the magnesium carbonate and a volume of water equal to the quantity of oil may be added and the whole thoroughly mixed. The oil, turpentine and water are thus in equal parts.

My invention may also be advantageously applied to the manufacture of oil lacquers and enamels, in which case the proportions of the essential ingredients may, for example only, be approximately:

Pigment _____hundredweight__ 1
Solvent (linseed oil or tung oil) ___gallons__ 6½
Magnesium carbonate _____pound__ 1
Water _____gallons__ 3½

The ingredients may be mixed together in similar manner to that in which paint is mixed according to my invention, as hereinbefore set forth.

In the application of the invention to the emulsification of tar or bitumen it is necessary to reduce either material to a liquid or semi liquid state either by the use of a solvent such as oil and/or kerosense, or by the application of heat and in this state a quantity of oil will be added and thoroughly mixed therewith when the mixture of magnesium carbonate and water may be added and thoroughly incorporated therewith. The proportions of bitumen, tar, oil, magnesium carbonate and water may be similar to those given in respect of the manufacture of paint, viz:

Bitumen or tar_____hundredweight__ 1
Oil _____gallons__ 6½
Magnesium carbonate _____pound__ 1
Water _____gallons__ 3½

These quantities may be greatly varied according to the purpose for which the emulsion is to be used but for general purposes the quantity of water used may be approximately equal to 50% of the oil added to the bitumen or tar. Should it be found at any time that an excess of water has been employed the mixture may usually be rectified by adding more oil and thoroughly mixing it into the emulsified bitumen or tar.

In the case of pigments, an increase in the stated proportions of magnesium carbonate results in the production of a paint, oil lacquer, enamel or the like having a glossy finish.

In the abovementioned instances of the practical application of this invention, the emulsion effected is known as an oil-water emulsion. However, it is found that water-oil emulsions can be formed as in the manufacture of water paints such as kalsomine, in which about three ounces of magnesium carbonate is added to 5 lbs. of the kalsomine or like powder. This mixture is mixed to a paste with water, then 5 ounces of preferably tung or linseed oil is added, and the whole stirred vigourously when additional water is added to bring the water paint to the desired consistency. Water paint made in this manner is found to adhere better to surfaces to which it is applied, and to have a superior finish when dry.

In the emulsification of oil according to this invention the proportions preferred are two parts of oil to one of water, and the quantity of magnesium carbonate may be approximately one part by weight of magnesium carbonate to 35 parts of water.

In the emulsification of bees or other wax, oil must be added to the wax. According to this invention a simple method is to place the wax, oil and water in a vessel and dissolve the wax by the application of heat when a small amount of magnesium carbonate will be added to the whole and thoroughly mixed together. Wax so treated will set or jel. If necessary oil or turps may be mixed with the emulsified wax whilst it is in a liquid or semi-liquid state, and in that case the mixture will not jel.

The preferred proportions that are used in the emulsification of wax according to this invention are as follows:

|  | Ozs. |
|---|---|
| Wax | 4 |
| Water (liquid measure) | 3 |
| Magnesium carbonate | ¼ |
| Oil (liquid measure) | 6 |

In the emulsification of tallow or grease according to this invention the proportions of the ingredients used may be as follows:

|  | Ozs. |
|---|---|
| Tallow or grease | 8 |
| Water (liquid measure) | 4 |
| Magnesium carbonate | 2 | and the method of preparing the emulsion may be similar to that described in respect of the emulsification of oil.

The term lacquer used herein refers to oil lacquers and they may be emulsified according to this invention by the addition of magnesium carbonate and water in the proportions previously stated.

I claim:

1. The method for producing a paint composition which comprises dissolving magnesium carbonate in water in the ratio of about one part magnesium carbonate to 35 parts water, mixing the magnesium carbonate solution with a solution containing a pigment and a vegetable oil, and emulsifying the oil and water by agitation, the amount of water present in the solution not exceeding the volumetric amount of oil present in the resulting solution.

2. A paint composition which comprises an emulsion of a vegetable oil and water and containing magnesium carbonate dissolved therein in the ratio of about one part magnesium carbonate to 35 parts water and a pigment, the amount of water in the emulsion not exceeding the volumetric amount of oil and in which the magnesium carbonate acts as an emulsifying medium.

LESLIE JAMES HOWLETT.